(12) United States Patent
Leeder et al.

(10) Patent No.: US 6,757,439 B2
(45) Date of Patent: Jun. 29, 2004

(54) JPEG PACKED BLOCK STRUCTURE

(75) Inventors: Neil M. Leeder, Apex, NC (US); Joan L. Mitchell, Longmont, CO (US); Nenad Rijavec, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 09/736,444

(22) Filed: Dec. 15, 2000

(65) Prior Publication Data

US 2002/0076115 A1 Jun. 20, 2002

(51) Int. Cl.[7] .............................. G06K 9/36; G06K 9/46
(52) U.S. Cl. ........................ 382/246; 382/247; 382/250; 341/67
(58) Field of Search ............................... 382/232, 236, 382/240, 245, 246, 247, 248, 249, 250, 251, 252, 253, 166, 167, 244; 358/1.15, 426.13, 426.15, 426.16; 341/65, 67; 375/240.23

(56) References Cited

U.S. PATENT DOCUMENTS 6,219,457 B1 * 4/2001 Potu .......................... 382/246

* cited by examiner

*Primary Examiner*—Timothy M. Johnson
*Assistant Examiner*—Ali Bayat
(74) *Attorney, Agent, or Firm*—Whitham, Curtis & Christofferson, P.C.; William H. Steinberg

(57) ABSTRACT

JPEG (Joint Photographic Experts Group) images are encoded and decoded as fast as possible for a variety of disparate applications. A novel structure stores the 8×8 Discrete Cosine Transform (DCT) blocks after entropy decoding in a JPEG decoder or after the Forward Discrete Cosine Transform (FDCT) in the JPEG encoder to use as an intermediate format between transform processes. The format was chosen to speed up the entropy decode and encode processes and is based on the information needed for the JPEG Huffman entropy coding, but lends itself to fast execution of other DCT based transforms, including arithmetic entropy coding.

11 Claims, 10 Drawing Sheets

| LENGTH 2 BYTES | DC VALUE 2 BYTES | AC1 COEF. 2 BYTES | AC2 COEF. 2 BYTES | AC3 COEF. 2 BYTES | ... | ACn COEF. 2 BYTES |
|---|---|---|---|---|---|---|

FIG. 7
PRIOR ART

| LENGTH BYTE | EOB1 BYTE | EOB2 BYTE | DC VALUE 2 BYTES | R/S BYTE | AC COEF. 1 OR 2 BYTES | R/S BYTE | AC COEF. 1 OR 2 BYTES | ... | EOB BYTE |
|---|---|---|---|---|---|---|---|---|---|
| 81 | 82 | | 83 | 84 | 85 | | | | 86 |

FIG. 8

JPEG PACKED BLOCK STRUCTURE

CROSS-REFERENCE TO RELATED APPLICATIONS

This application is related to U.S. patent application Ser. No. 09/736,445, filed concurrently herewith and assigned to the Assignee of the present invention, which is hereby fully incorporated by reference.

BACKGROUND OF THE INVENTION

1. Field of the Invention

The present invention generally relates to color image compression for diverse applications and, more particularly, to a structure for storing Discrete Cosine Transform (DCT) blocks after entropy decoding in a JPEG (Joint Photographic Experts Group) decoder or after the Forward Discrete Cosine Transform (FDCT) in the JPEG encoder to use as an intermediate format.

2. Background Description

The purpose of image compression is to represent images with less data in order to save storage costs or transmission time and costs. The most effective compression is achieved by approximating the original image, rather than reproducing it exactly. The JPEG standard, discussed in detail in "JPEG Still Image Data Compression Standard" by Pennebaker and Mitchell, published by Van Nostrand Reinhold, 1993, which is hereby fully incorporated by reference, allows the interchange of images between diverse applications and opens up the capability to provide digital continuous-tone color images in multi-media applications. JPEG is primarily concerned with images that have two spatial dimensions, contain grayscale or color information, and possess no temporal dependence, as distinguished from the MPEG (Moving Pictures Experts Group) standard. The amount of data in a digital image can be extremely large, sometimes being millions of bytes. JPEG compression can reduce the storage requirements by more than an order of magnitude and improve system response time in the process.

One of the basic building blocks for JPEG is the Discrete Cosine Transform (DCT). An important aspect of this transform is that it produces uncorrelated coefficients. Decorrelation of the coefficients is very important for compression because each coefficient can be treated independently without loss of compression efficiency. Another important aspect of the DCT is the ability to quantize the DCT coefficients using visually-weighted quantization values. Since the human visual system response is very dependent on spatial frequency, by decomposing an image into a set of waveforms, each with a particular spatial frequency, it is possible to separate the image structure the eye can see from the image structure that is imperceptible. The DCT provides a good approximation to this decomposition.

The most straightforward way to implement the DCT is to follow the theoretical equations. When this is done, an upper limit of 64 multiplications and 56 additions is required for each one-dimensional (1-D) 8-point DCT. For a full 8×8 DCT done in separable 1-D format—eight rows and then eight columns—would require 1,024 multiplications and 896 additions plus additional operations to quantize the coefficients. In order to improve processing speed, fast DCT algorithms have been developed. The origins of some of these algorithms go back to the algorithm for the Fast Fourier Transform (FFT) implementation of the Discrete Fourier Transform (DFT). The most efficient algorithm for the 8×8 DCT requires only 54 multiplications, 464 additions and 6 arithmetic shifts.

The two basic components of an image compression system are the encoder and the decoder. The encoder compresses the "source" image (the original digital image) and provides a compressed data (or coded data) output. The compressed data may be either stored or transmitted, but at some point are fed to the decoder. The decoder recreates or "reconstructs" an image from the compressed data. In general, a data compression encoding system can be broken into three basic parts: an encoder model, an encoder statistical model, and an entropy encoder. The encoder model generates a sequence of "descriptors" that is an abstract representation of the image. The statistical model converts these descriptors into symbols and passes them on to the entropy encoder. The entropy encoder, in turn, compresses the symbols to form the compressed data. The encoder may require external tables; that is, tables specified externally when the encoder is invoked. Generally, there are two classes of tables; model tables that are needed in the procedures that generate the descriptors and entropy-coding tables that are needed by the JPEG entropy-coding procedures. JPEG uses two techniques for entropy encoding: Huffman coding and arithmetic coding. Similarly to the encoder, the decoder can be broken into basic parts that have an inverse function relative to the parts of the encoder.

JPEG compressed data contains two classes of segments: entropy-coded segments and marker segments. Other parameters that are needed by many applications are not part of the JPEG compressed data format. Such parameters may be needed as application-specific "wrappers" surrounding the JPEG data; e.g., image aspect ratio, pixel shape, orientation of image, etc. Within the JPEG compressed data, the entropy-coded segments contain the entropy-coded data, whereas the marker segments contain header information, tables, and other information required to interpret and decode the compressed image data. Marker segments always begin with a "marker", a unique 2-byte code that identifies the function of the segment.

The quest to encode and decode JPEG images as fast as possible continues. For example, high performance color printers, operating with 4-bits per each CMYK (Cyan, Magenta, Yellow, blacK) component, are expected to run at 200 pages/minute. Images may arrive as 600 pixels/inch YCrCb (a color coordinate system used in the development of the JPEG standard), RGB (Red, Green, Blue), or CieLab JPEG images that need to be transformed into 300 pixels/inch CMYK independent JPEG images. Some images may need to be rotated 90° and scaled up or down to fit the assigned raster space. In another example, set top boxes for Internet use are expected to use an on board microprocessor to browse (i.e., decode and display) JPEG images on the Internet in 0.2 to 2 seconds. These images may need to be scaled to fit the output display.

SUMMARY OF THE INVENTION

It is therefore an object of the present invention to provide a format for storing DCT data that would require minimal computational effort to generate from Huffman entropy data, yet be sufficiently unpacked so that a number of DCT-domain image algorithms could efficiently be applied to the data.

It is another object of the invention to provide a data format that does not impose additional processing costs if the image must be decompressed fully to raster format.

According to the invention, there is provided a novel structure storing the 8×8 Discrete Cosine Transform (DCT) blocks after entropy decoding in a JPEG decoder or after the Forward Discrete Cosine Transform (FDCT) in the JPEG encoder to use as an intermediate format. The format was chosen to speed up the entropy decode and encode processes and is based on the information needed for the JPEG Huffman entropy coding, but lends itself to fast execution of other DCT based transforms.

BRIEF DESCRIPTION OF THE DRAWINGS

The foregoing and other objects, aspects and advantages will be better understood from the following detailed description of a preferred embodiment of the invention with reference to the drawings, in which:

FIG. 7 is a block diagram of the IBM JPEG Express DCT block structure;

FIG. 8 is a block diagram of the JPEG packed block structure in accordance with the invention;

DETAILED DESCRIPTION OF A PREFERRED EMBODIMENT OF THE INVENTION

Figure 1:
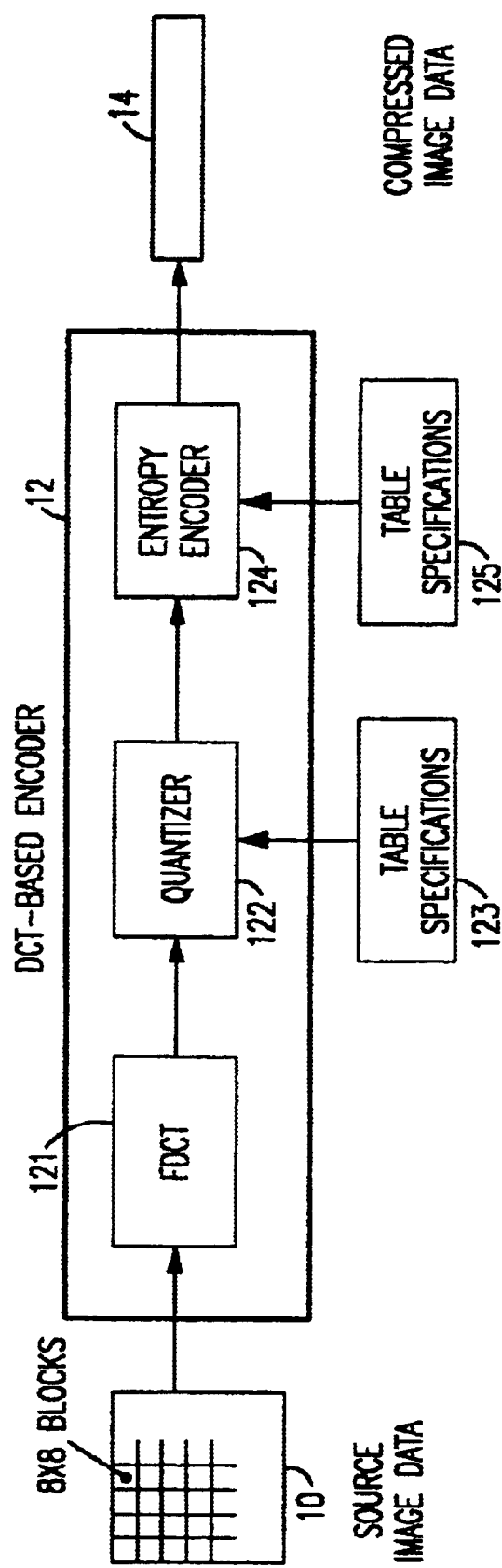
FIG. 1 Prior Art is a simplified prior art block diagram of a DCT-based JPEG encoder on which the invention may be practiced.

Referring now to the drawings, and more particularly to FIG. 1, there is shown a simplified block diagram of a DCT-based encoder. A source image 10 sampled data in 8×8 blocks are input to the encoder 12. Each 8×8 block is transformed by the FDCT 121 into a set of 64 values, referred to as the DCT coefficients. One of these values is referred to as the DC coefficient, and the other 63 values are referred to as AC coefficients. Each of the 64 coefficients are then quantized by quantizer 122 using one of 64 corresponding values from a quantization table 123. After quantization, the DC coefficient and the 63 AC coefficients are prepared for entropy encoding. The previous quantized DC coefficient is preferably used to predict the current DC coefficient and the difference is encoded. The 63 AC coefficients, however, are not differentially encoded but, rather, are converted into a zig-zag sequence that approximates increasing spatial frequency of the corresponding DCT coefficients in both the horizontal and vertical directions. (Since the human eye is less sensitive to some ranges of spatial frequency than others, the zig-zag sequence serves to group DCT coefficients by the percepibility of the image information they represent.) The quantized coefficients are then passed to an entropy encoding procedure 124 using table specifications 125. This procedure compresses the data further. One of two entropy encoding procedures can be used, Huffman encoding or arithmetic encoding. If Huffman encoding is used, then Huffman table specifications must be provided, but if arithmetic encoding is used, then arithmetic coding conditioning table specifications must be provided. The output of the entropy encoder is the compressed image data 14.

Figure 2:
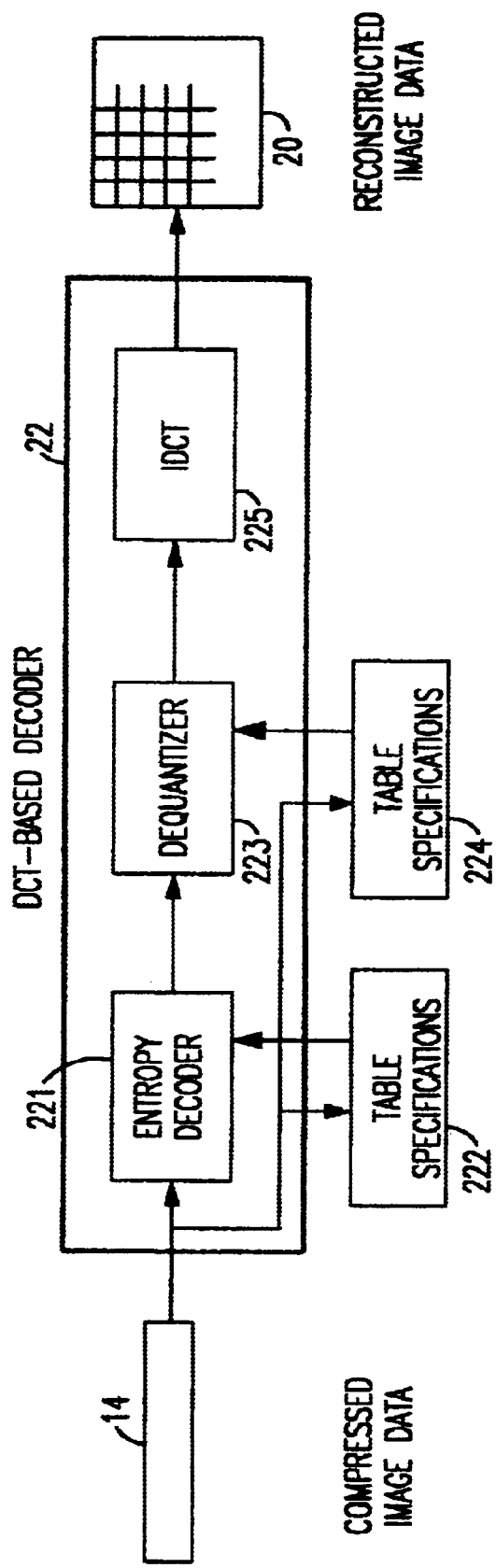
FIG. 2 Prior Art is a simplified prior art block diagram of a DCT-based JPEG decoder on which the invention may be practiced.

FIG. 2 shows a simplified block diagram of the DCT-based decoder. Each step shown performs essentially the inverse of its corresponding main procedure within the encoder shown in FIG. 1. The compressed image data 14 is input to the decoder 22 where it is first processed by an entropy decoder procedure 221 which decodes the zig-zag sequence of the quantized DCT. This is done using either Huffman table specifications or arithmetic coding conditioning table specifications 222, depending on the coding used in the encoder. The quantized DCT output from the entropy decoder is input to the dequantizer 223 which, using table specifications 224, outputs dequantized DCT coefficients to IDCT (Inverse Discrete Cosine Transform) 225. The output of the IDCT 225 is the reconstructed image 20.

Figure 3:
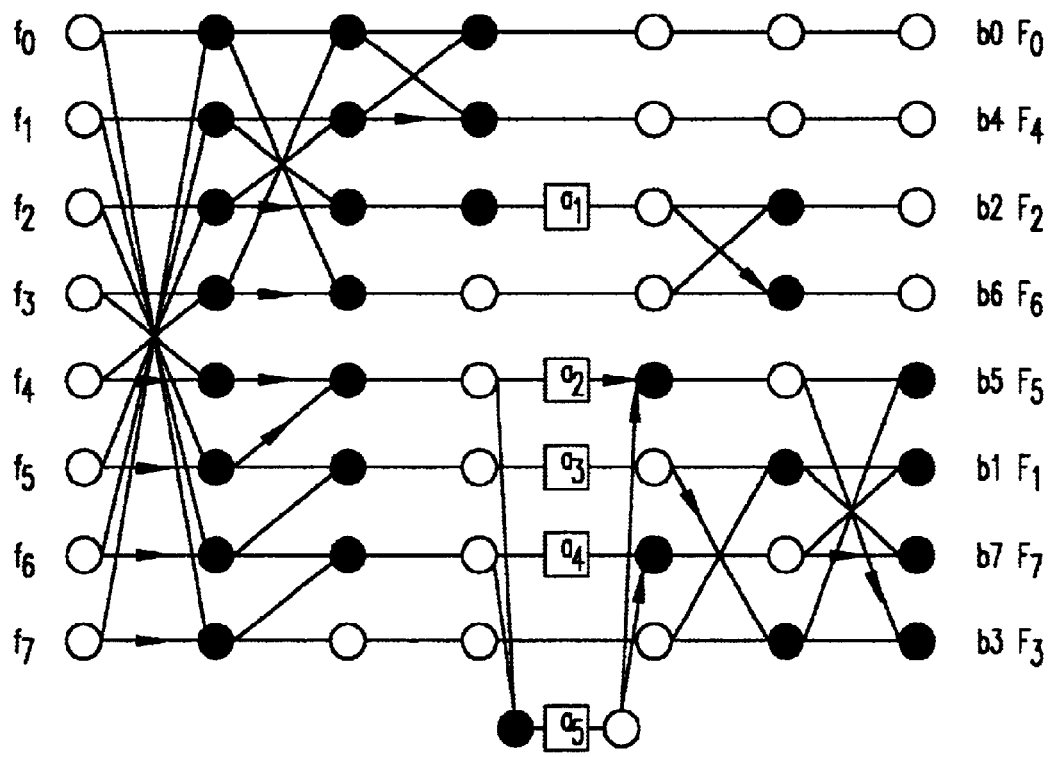
FIG. 3 is a flowgraph showing a prior art one dimensional (1-D) fast Forward Discrete Cosine Transform (FDCT)

FIG. 3 shows the flowgraph for a prior art one dimensional (1-D) fast Forward Discrete Cosine Transform (FDCT). See W. B. Pennebaker and J. L. Mitchell, *JPEG Still Image Data Compression Standard*, Van Nostrand Reinhold (1993), Chapter 4 "The Discrete Cosine Transform (DCT)", FIGS. 4–8. A fast DCT is a sequence of operations that efficiently computes the set of weighted sums and differences making up the DCT coefficients. The algorithm implemented by the flowgraph of FIG. 3 derives the DCT coefficients by a simple scaling of the real part of the Discrete Fourier Transform (DFT) coefficients. In this flowgraph, the flow is from left to right, and signals are summed where their lines merge at a node (indicated by a solid circle). If a line has an arrowhead, then the signal is negated or inverted before the addition to (i.e., subtracted from) the other signal fed to the node. For example, considering the first solid circle node in the top line of the flowgraph (signal line 0), the input signals are f(0) and f(7) and the output is f(0)+f(7); however, in the first solid circle node of the bottom line of the flowgraph (signal line 7), the input signals are again f(0) and f(7), but the output is f(0)−f(7) since f(7) is first negated prior to summing. Multiplication is by a box in the signal line. For the case illustrated in FIG. 3, the multipliers are $a_1=0.707$, $a_2=0.541$, $a_3=0.707$, $a_4=1.307$, and $a_5=0.383$. Counting the solid circles, there are 29 additions required. There are 13 multiplications required, but since eight of the multiplications are to scale the final output to the correct range, there are only 5 multiplications actually required before quantization, making this a very efficient 1-D DCT.

Figure 4:
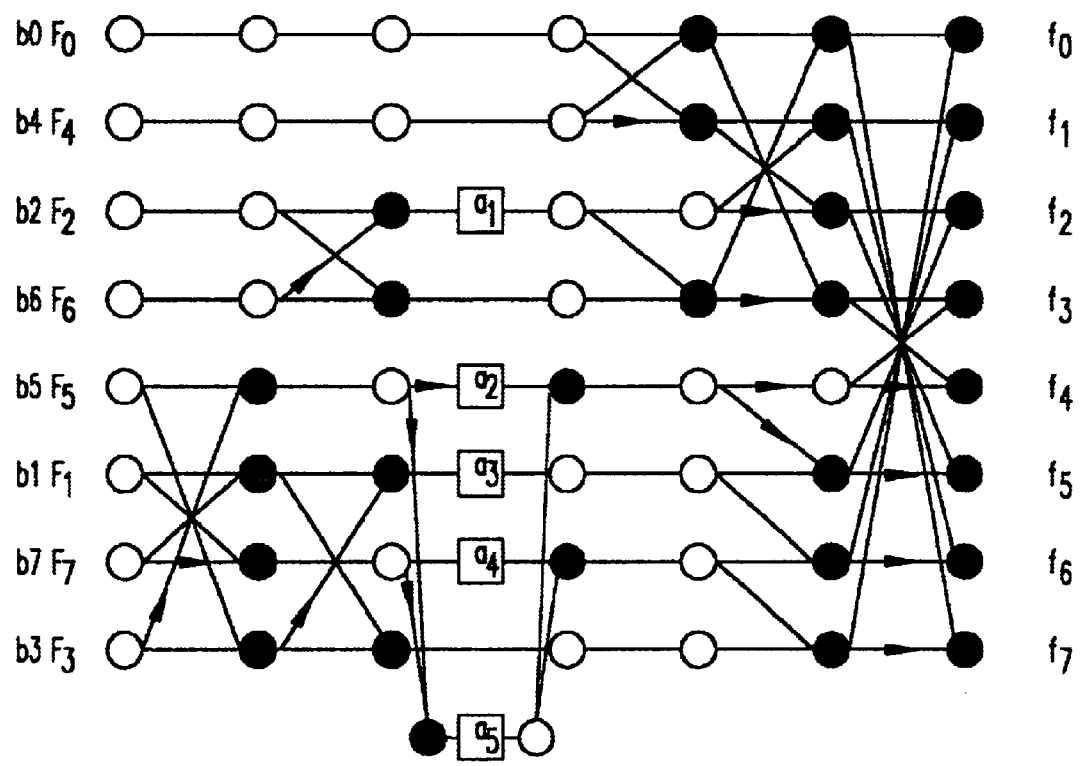
FIG. 4 is a flowgraph showing a prior art 1-D fast Inverse Discrete Cosine Transform (IDCT)

FIG. 4 shows the flowgraph for the 1-D fast Inverse Discrete Cosine Transform (IDCT). It is simply the inverse of the flowgraph of FIG. 3, following the same conventions as described above.

Figure 5:
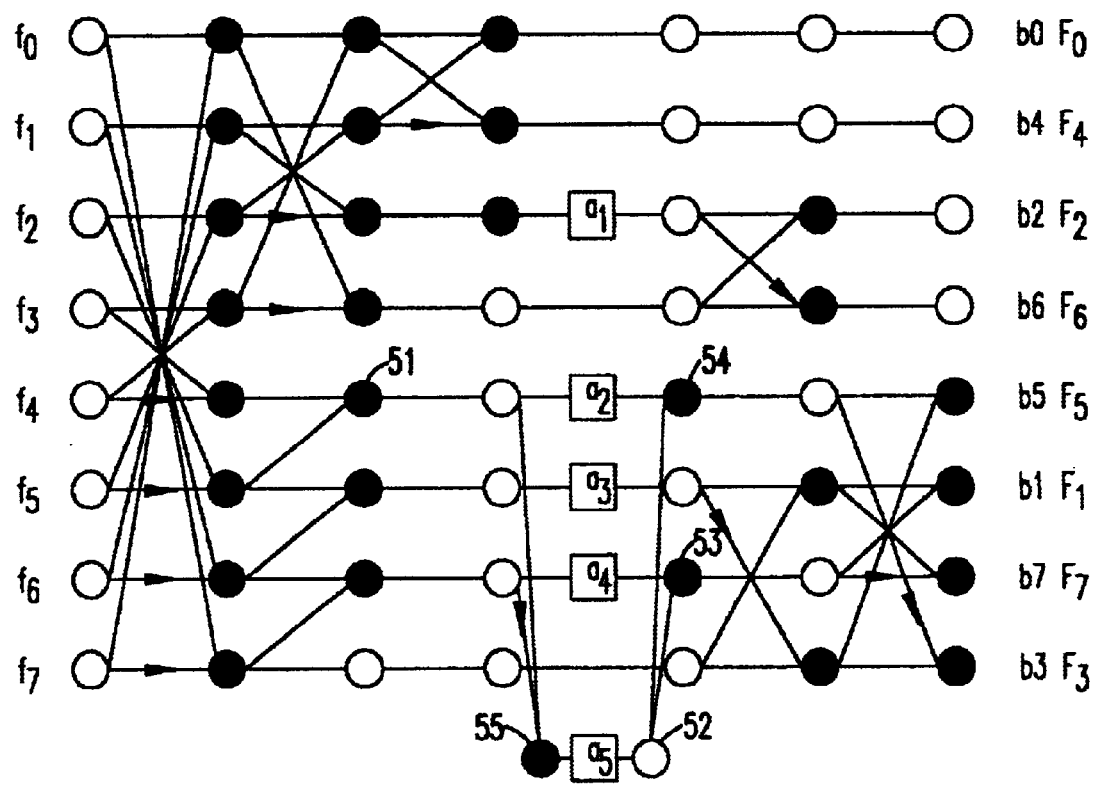
FIG. 5 is a flowgraph showing an improved 1-D fast FDCT according to one aspect of the invention.
Figure 6:
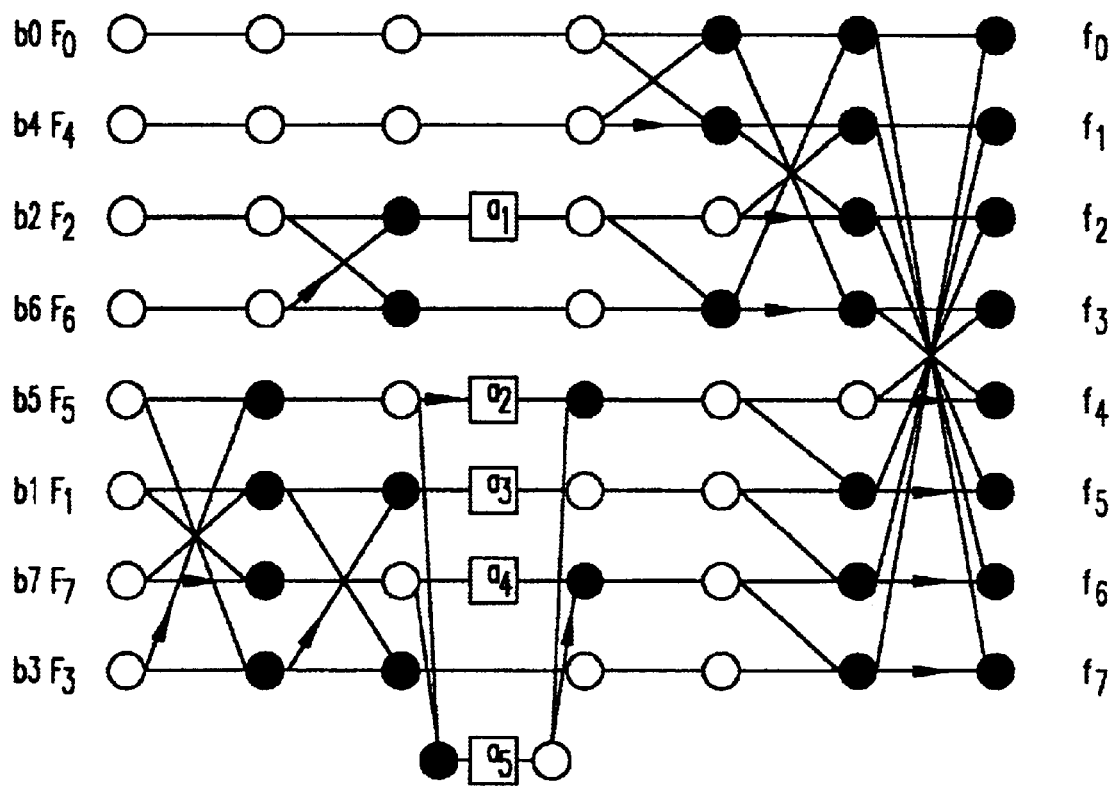
FIG. 6 is a flowgraph showing an improved 1-D fast IDCT according to one aspect of the invention.

Turning now to FIG. 5, there is shown the flowgraph for an improved 1-D FDCT according to one aspect of the invention. Contrasting FIG. 5 with FIG. 3, it will be observed that five negate operations (as represented by an arrowhead) have been eliminated in the improved 1-D FDCT represented by the flowgraph of FIG. 5 while one arrowhead has been added. The five negate operations which have been eliminated are the two signals entering node 51, the signal between nodes 52 and 53, and the two signals entering node 54. The one negate operation which has been added is represented by the new arrow head for the second signal entering node 55. A corresponding improvement is made in the 1-D IDCT, as shown in FIG. 6.

Because the two dimensional (2-D) DCT is separable, the summations can be done as 8 1-D DCTs on all rows, and then 8 1-D DCTs on the 8 columns formed by the coefficients for the rows. In hardware, the negate operation is not significant. The chip designer can chose whether to use a positive or negative signal for the next stage. But in some circumstances in software it can add an extra operation. For those nodes in which only one input has an arrowhead, then the negation becomes a subtraction and simply replaces the addition. However, if two inputs have arrow heads, one input must first be inverted (negated) before the other can be subtracted. Many RISC (Reduced Instruction Set Computer) architecture machines, such as the IBM/Motorola PowerPC™ processor, need as much time for the negation operation as for the addition or subtraction. Therefore, the second arrowhead on inputs counts as much as an extra addition. The two inputs to node 51 are such a case. This extra operation needs to be counted in with the additions in considering the number of operations. The two inputs to node 53 were potentially another such case, but could have been handled by converting the constant a2 into the negation of a2 so that the output from the multiplication already was negative. The new arrowhead into node 55 replaces the addition with a subtraction and so does not add software operations. Since the two-dimensional (2-D) FDCT needs 16 1-D FDCTs, the savings in operations is 16 operations for every block in the image. A similar savings results for the 2-D IDCT of FIG. 6.

FIG. 7 shows the IBM JPEG Express code produced jointly between IBM Research and IBM Marketing for the Image Plus Product. This structure stores the DCT quantized coefficients in zig zag scan order as 2-bytes per coefficient. The zeroes are not packed into a R/S (run/size) byte in preparation for Huffman coding. Each coefficient up to the End of Block (EOB) is assigned two bytes. The leading two bytes is a length field to define the number of bytes in the DCT block from which the EOB can be calculated. Alternatively, the length field can be split into a byte length and another byte for the EOB position.

This method when used for the JPEG code for such demanding applications as high performance color printers and possibly Internet browsers has proved inefficient. Having to load zero-valued coefficients and test for nonzero values is computationally too expensive for the speeds demanded for these applications. By having to load and store many zero coefficients, cache misses were also induced. Since many blocks have five or fewer non-zero coefficients, this method is also wasteful of memory.

According to the present invention, and with reference to the packed format FIG. 8, in accordance with the invention, each DCT block starts with a length byte 81 followed by two bytes 82 to save the location of the End of Block (EOB) for sequential coding and the current EOB for progressive coding. The quantized DC coefficient 83 is stored in the next sixteen bits. As mentioned, although it is generally preferred that the difference between the current DC coefficient and the DC coefficient in the previous block is what is actually coded, saving the DCT without the prediction provides that the DCT blocks are completely independent of the coding order and self-contained and that actual DC coefficient values are available for use without computation and in any order for any desired transformation in image enhancement methods such as AC prediction.

FIG. 8 shows the DC coefficients as stored in two bytes without prediction. This is most useful if the prediction direction is going to change or is not yet known. However, for those cases where the purpose of the intermediate format is to save the information while statistics are being collected to generate custom Huffman tables, saving the DC value as the prediction converted into an R/S byte followed by the one or two bytes of extra bits will minimze the later processing. For components that have the minimum height, the prediction will be always horizontal (wrapping from the right edge to the next block row on the left edge) and not changed by any interleaving process. In such cases, saving the DC value as the predicted difference in the R/S format will not add cycles.

It is possible that both formats may be used simultaneously, namely the original DC value followed by its predicted difference in R/S byte and extra bits format. These extra one to three bytes per block can save processing if the precision does not change. In addition, the different components can save the DC values in different formats as part of the intermediate format of the invention. The luminance which is usually the component with the highest resolution could save the DC values without prediction while the two chrominance components may save it as predicted value in R/S and extra bits format.

Each non-zero AC coefficient is stored in two or more bytes. The first byte 84 is the R/S byte used for Huffman encoding; i.e., the high order nibble R=first four bits) equals the run of zero AC coefficients in zig zag scan order up to fifteen, and the low order nibble (S=last four bits) is the number of extra bits needed to uniquely code the non-zero magnitude. A preferred implementation of this packed format stores the extra bits in the next one or two bytes 85, depending upon whether the second byte was needed (i.e., S>8). The final byte is the symbol 0x00 which indicates that an EOB needs to be coded. An alternative implementation always follows the R/S byte with the actual AC value in two bytes. The sixteen bits are sufficient to hold all quantized AC coefficients even for the 12-bit/sample raster data and the heirarchical differences required for the high performance color printer application alluded to above. S will be zero to indicate a zero-value run of sixteen bits or more and non-zero values indicate the number of bits required for a non-zero coefficient follow a run or remainder of a run of less than sixteen zero-valued coefficients specified by R.

It should be noted that the block depicted in FIG. 8 contains both the length 81 and an explicit EOB marker entry 86. Either length of EOB entry (but not both) can be omitted since these signals respectively contain information which is redundant over each other. However, it is considered preferable to retain both, since some algorithms for manipulating DCT blocks in this format can be encoded more efficiently by using the length information while others can be made more efficient by utilizing the EOB entry.

FIG. 8 shows the most comprehensive version of the JPEG packed block data structure in accordance with the invention. The AC coefficients are shown as one or two bytes. When storing the information exactly as the extra bits (left of right justified in the one or two bytes), the S value can be used to determine if the second byte is needed (S>8). This is more efficient when entropy decoding and then entropy re-encoding is performed. This format is best with large quantization vales that most give quantized coefficients of magnitude 1. For such cases, the quantization division step step can be efficiently converted into comparisons of Q/2, 3Q/2, etc.

After the FDCT, it may be more useful to save the non-zero coefficients always as two bytes, particularly if arithmetic coding is to be chosen for entropy coding. The Huffman coding extra bits are not utilized. For Huffman entropy coding, the R/S byte is needed to collect Huffman table statistics even before the exact extra bits are calculated. Progressive encoding can also use the S nibble to skip over coefficients that are still too small for the particular scan.

Many variants are possible. For example, the first three bytes are not necessarily needed for a sequential baseline transcoding program. If the intermediate format is intended to save the DCT blocks just long enough to create new custom Huffman tables for re-encoding or to convert between non-interleaved and interleaved baseline sequential baseline JPEG formats, the EOB symbol (0×00) is sufficient as the only EOB indicator.

For applications where re-encoding of all blocks may not be desired, the length byte allows simple skipping over blocks. This is particularly useful for merge operations in the transform domain where parts of two images are used to create a composite new image. If only the statistics for the DC Huffman tables are collected in a pass through the packed DCT data, the length byte allows quick skipping over the AC information. The packed block structure can interleave the different color component blocks (e.g. from an entropy coding of entropy coded data) or have only the blocks for a given color together (e.g. from the FDCT of each color component). If only the luminance component is to be re-encoded from a YcbCr interleaved image, then the Cb and Cr blocks can be skipped by use of the length byte.

Sometime special fast inverse DCT algorithms are designed for blocks that have not more than the first five AC coefficients (i.e. EOB follows the at most k=5 AC coefficient). For such programs a maximum k value saved in the EOB 1 byte would be useful.

For progressive encoding, the encoder needs to keep both the maximum k value in the EOB 1 byte and the maximum k coded in the previous progressive pass in the EOB2 byte. The final EOB byte 86 may not be desired. For progressive decoding, only the maximum k coded in the previous progressive pass is needed and known and could be saved in the EOB2 byte without the EOB 1 byte. Since the DC coefficient is always coded in an independent scan, the length byte will generally be useful for progressive encoding and decoding in order to skip over the AC coefficients during the DC scan.

It should be understood from the foregoing that the EOB information can be indicated in numerous ways and particular ways of indicating that information may be preferable to others for a particular application. Further the invention provides conversion between types of EOB indication and/or multiple redundant indications. Therefore, it should be understood that the term "indicator" is intended to be generic to an EOB symbol, Hexadecimal code 0×00, length data, and one or more bytes containing k values.

Figure 9:
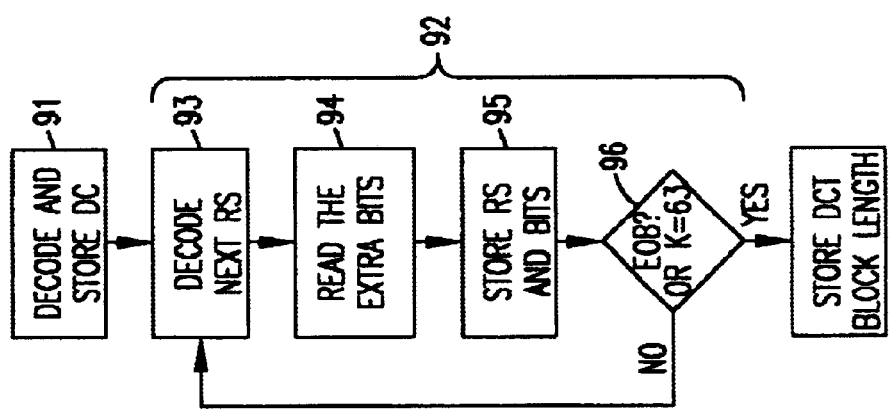
FIG. 9 is a flowgraph showing an algorithm to decompress the Huffman entropy data into the packed DCT block structure in accordance with the invention.

FIG. 9 represents a flowgraph of a preferred algorithm for converting Huffman-encoded JPEG data into packed DCT block format in accordance with the invention. The algorithm first decodes and stores the DC coefficient using two bytes as shown at 91 and then enters loop 92, decoding an entry at a time. For each entry, the RIS coefficient is decoded 93 and then the extra bits are read 94 and stored 95 using zero, one or two bytes, depending on the S value in the decoded R/S byte. The loop runs until the EOB signal (containing no extra bits) has been processed or k=63 (the maximum number of AC coefficient values) as shown at 95. The block length is then counted or otherwise computed and stored 96. It should be noted that the format of the DCT block thus enables decoding from the entropy data with a minimum of computational burden and minimizes hardware requirements.

Figure 10:
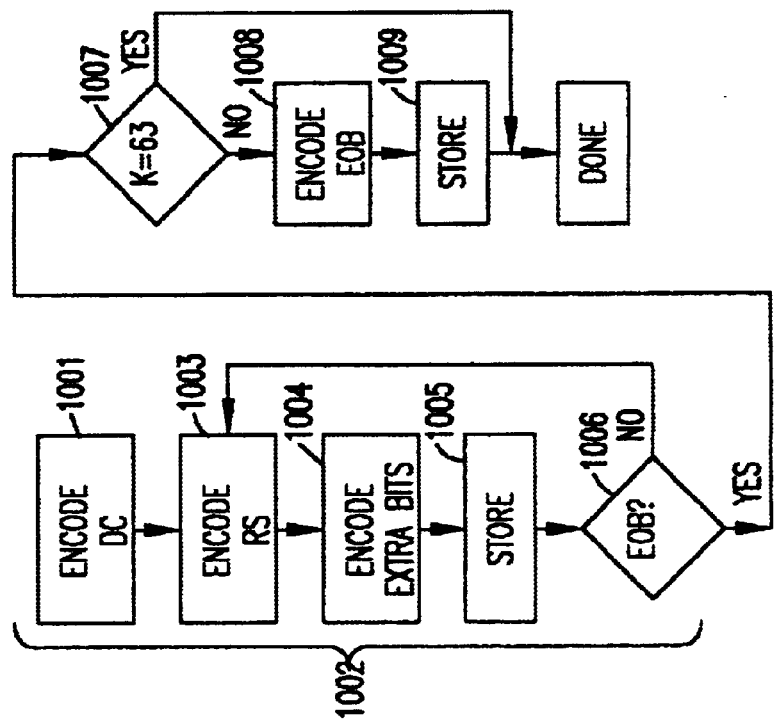
FIG. 10 is a flowgraph showing an algorithm to encode a packed DCT block using Huffman entropy coding.

FIG. 10 shows a flowgraph for the inverse of the operation depicted in FIG. 9, namely, encoding a packed DCT block into entropy encoded data. The DC coefficient is encoded first 1001 and then a loop 1002 is entered. Each execution of the loop performs encoding of the R/S byte 1003, encoding of the extra bits 1004 in accordance with the S value 1004 and storage of both 1005. If an EOB code is found at 1006, the process branches (for the current block) and k is tested to determine if k=63 at 1007. If so, the process is complete since k=63 indicates the maximum number of values that can be provided and no EOB symbol need be separately encoded. If k is less than 63, the EOB is encoded 1008 and stored 1009 to complete the process. It should be noted that each entry is already in roughly the form required for the Huffman encoded data so that the hardware requirements are minimized and the process can proceed with maximum speed to encode each R/S and extra bits pair in turn until the EOB marker is reached.

Figure 11:
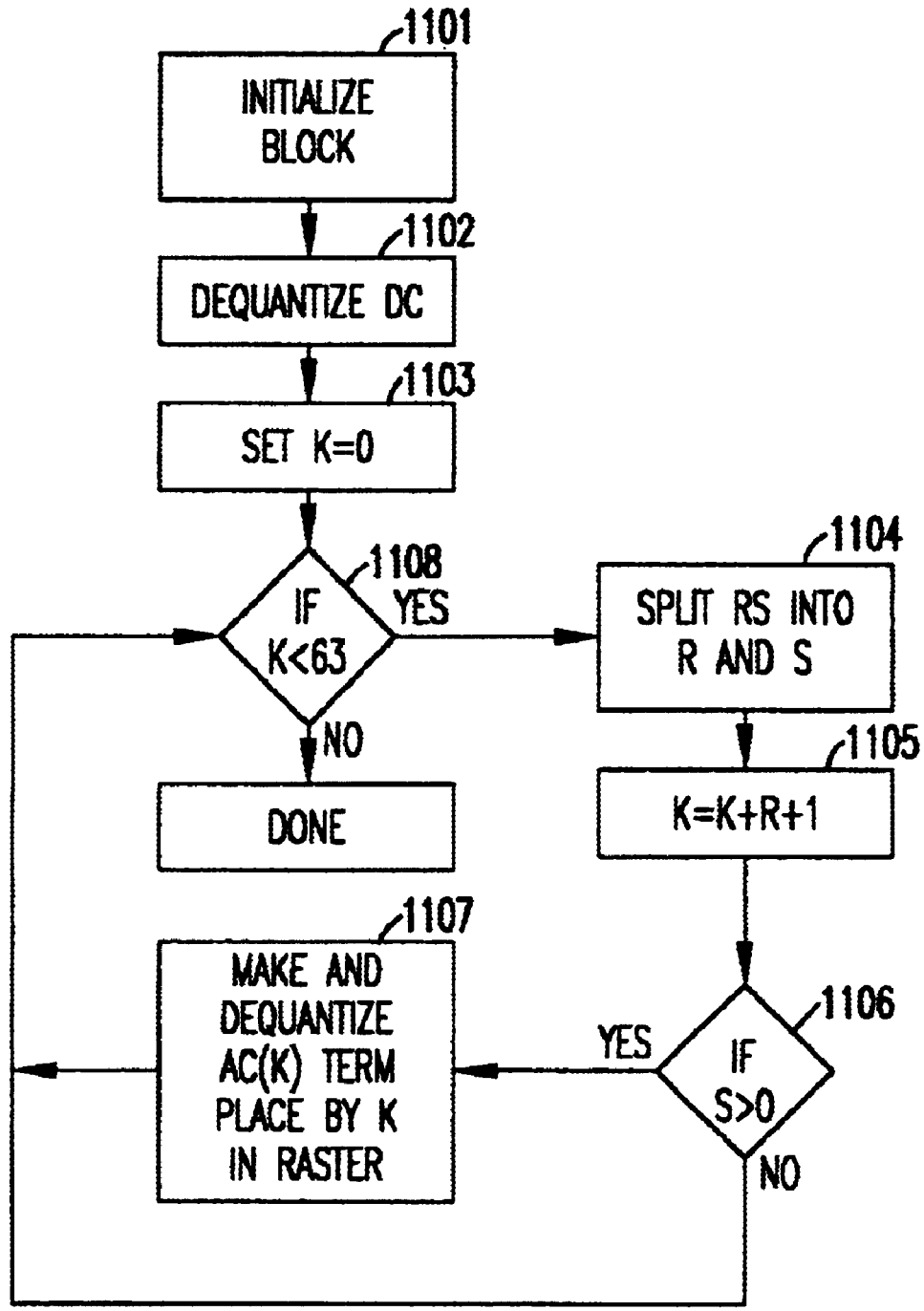
FIG. 11 is a flowgraph showing an algorithm to unpack the packed DCT block format into a dequantized raster scan order DCT block suitable for an inverse DCT algorithm.

Before the blocks are stored, in accordance with the invention, the blocks can, optionally, be decompressed. To do so, before the image is fully decompressed the blocks must be transformed into an unpacked, unquantized (referring to the original image values) form to include zero valued coefficients. A preferred algorithm for performing this transformation is shown in FIG. 11. This process begins by initializing 1101 the storage area for the unpacked block to zero. The dequantized (referring to the reconstructed coefficients) DC coefficient is then stored 1102 and k is set to zero 1103 in accordance with the programming convention of indexing arrays from zero. A loop for dequantizing the AC coefficients is then followed while k is less than 63.

In each iteration of the loop, the R/S byte is split into its constituent R and S nibbles where, as before, R is the high order bits and S is the low order bits. Since R indicates the number of consecutive zero value AC coefficients, k is advanced by R+1 at 1105 to point to the location of the AC coefficient being decoded. The R zero-valued coefficients can be safely skipped since the storage space was initialized to zero at 1101. The S (size) term can be zero in the case where the run of zero-valued coefficients has a value greater than sixteen and no further processing is required for this particular AC coefficient. However, if S is positive, as determined at 1106 the AC coefficient is non-zero and must be generated by being dequantized and stored at 1107 in raster scan order (as opposed to the zig-zag scan order in the packed block; conversion from one to the other is generally performed using a look-up table indexed to k) and is thus ready for the inverse DCT transform operation. The loop continues while k is less than 63 and, when k=63 and the processing is complete, the loop is exited at 1108.

It will be apparent to those skilled in the art that the algorithm discussed above in connection with FIG. 11 must be performed if a DCT block is to be inverse DCT transformed regardless of the format used to store the block. For example, if the data block format of FIG. 7 is used, the algorithm of FIG. 11 must be executed when the block is generated. (Such transformations are required preparatory to most other transformations likely to be desired, such as rotation, scaling, merging, shifting and the like.) However, it is a particular meritorious effect of the present invention that this algorithm need not be performed if all the image operations desired can be performed from the packed DCT format of FIG. 8 in accordance with the invention.

Figure 12:
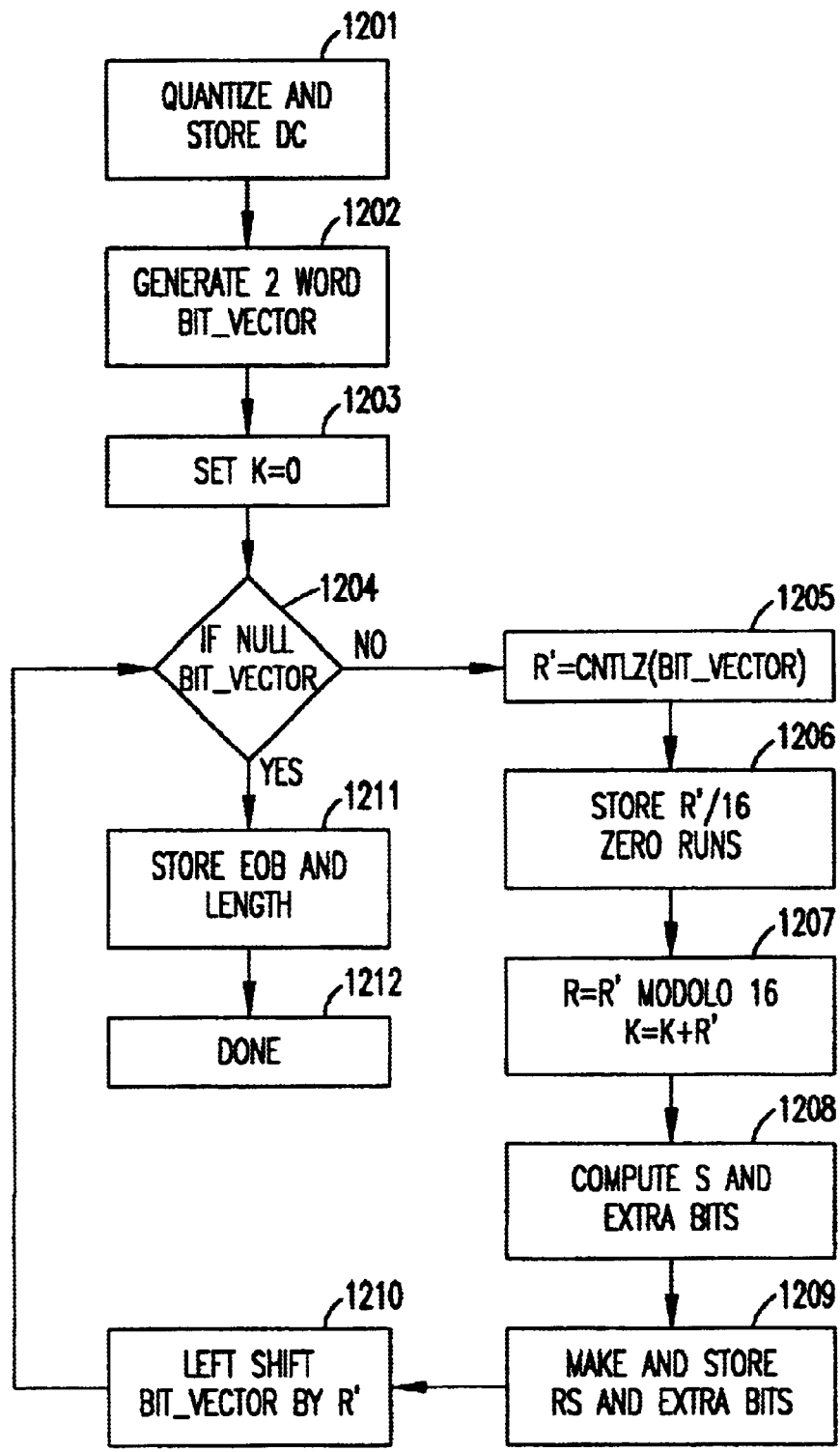
FIG. 12 is a flowgraph showing an algorithm for converting the unpacked, unquantized DCT block into a packed format.

FIG. 12 shows the flowgraph of the algorithm to convert the unquantized DCT block into a packed format. The DCT block can be either zig-zag or raster format but is always in a zig-zag format when input to a compression algorithm or a packing algorithm in accordance with the invention. The output zig-zag format is achieved by simply accessing the input block in a zig-zag fashion. The algorithm starts by quantizing and storing 1201 the DC coefficient. Next, a bit vector of 64 bits (two words) is generated 1202 having a bit for each DCT coefficient and sorted in zig-zag order. If a particular DCT coefficient is zero, the corresponding bit of the bit vector is set to "0" but otherwise is set to "1". This is preferably performed serially, shifting the vector content as each AC coefficient term is generated since the DC coefficient has already been processed. It should be recognized that the generation of the bit vector need not be performed as a separate step but can be achieved as part of the forward DCT algorithm.

Similarly to the algorithm of FIG. 11, k is set to zero to indicate that the DC coefficient has been processed. A loop is provided for processing the AC coefficients unless the bit vector (or the remaining unprocessed portion thereof) is null, as determined at 1204. The loop begins by counting the leading zeros in the bit vector, as shown at 1205; formalized as R'=cntlz(bit_vector). If R' is greater than fifteen, R'/16 ZRL (hex f0) terms (each 16 ZRL is a sigle symbol indicating a run of sixteen zero values) are stored in the packed block, each denoting a run of sixteen zero-valued coefficients, k is advanced by R' and R is then computed as R=R' modulo16, as shown at 1206 and 1207.

Advancement of k by R' (e.g. k=k+R') yields a value of k which now points to a DCT coefficient value which is known to be non-zero and the S (size) value and extra bits can be computed for this current non-zero value and the corresponding R/S values and the extra bits are stored as shown at 1209. The bit vector is then shifted (left) by R', as shown at 1210 and the process loops to 1204. If it is determined at 1204 that the remainder of the vector is null (all zeroes), all non-zero DCT coefficient values have been processed and the EOB marker and block length can be generated or computed and stored to complete 1212 the storage of a block in packed format in accordance with the invention.

In view of the foregoing and particularly the discussions of FIGS. 8 through 12 it is seen that the transformation between packed and unpacked format of FIGS. 7 and 8 can be performed very rapidly since a sequence of zero-valued coefficients (enhanced by zig-zag ordering) can be processed as a unit by a simple operation of incrementing a pointer value by a run length. The resulting packed format is extremely efficient for transmission and/or storage since up to sixteen zero-valued coefficients can be expressed in only three bytes. The magnitude of these improvements can be appreciated by the recognition that many blocks will have only a relatively few non-zero DCT coefficients (e.g. often five or fewer) while expressing sixty four DCT coefficients which, in turn, represent the image values of a block of sixty-four image points with eight or twelve bit precision. Further, the number of zero-valued DCT coefficients can be (and generally) is increased by quantization or truncation at spatial frequencies to which the human eye is relatively insensitive; yielding increased levels of data compression.

The increased level of data compression allows much increased speed of transmission to support extremely high levels of performance for printers and displays. Moreover, processing speed is enhanced through multiple encoding and decoding processes incident to the compression by the packed data structure in accordance with the invention since significant portions of the packing process can be performed incident to the encoding and other transformations (such as Huffman entropy coding) are facilitated by the format in which the data is presented and many other desirable transformations may be performed directly from the packed data format without any other change of form. It should be appreciated, in this regard, that subsequent to quantization of the original image data the data packing in accodance with the invention is lossless and contains all of the image data resulting from the quantization process. Therefore, by suppression of zero-valued DCT coefficients and representation of them in R/S values in a manner well-matched to their usual occurrence, much less data is required to be processed for any given transformation process. Even for transformations for which expansion to the format of FIG. 7 is required by the algorithm of FIG. 11, the expansion can be performed very quickly by virtue of avoidance of testing for non-zero values and processing sequences of zero-valued coefficients as a group uasing processes that require reduced numbers of operations.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A packed structure for image data resulting from a discrete cosine transform operation, said format comprising
   a run/size (RS) byte including a nibble of more significant bits indicating a run length from a non-zero AC discrete cosine transform coefficient to a next non-zero discrete cosine transform coefficient and a nibble of less significant bits indicating a number of bits required to quantify a nonzero AC discrete cosine transform coefficient,
   an AC discrete cosine transform coefficient adjacent a run/size byte, and
   and an end-of-block indicator.

2. A packed data structure as recited in claim 1, further including
   a DC discrete cosine transform coefficient.

3. A packed data structure as recited in claim 1, wherein said end-of-block indicator includes
   an end-of-block symbol.

4. A packed data structure as recited in claim 3, wherein said end-of-block symbol is a hexadecimal code of 0x00.

5. A packed data structure as recited in claim 3, further including
   length of block data or an end-of-block address.

6. A packed data structure as recited in claim 1, wherein said end-of-block indicator includes
   length of block data or end-of-block address.

7. A packed data structure as recited in claim 1, wherein said end-of-block indicator includes one or two AC coefficient numbers (k).

8. A method of placing discrete cosine transform data of a data block in a packed format, said method comprising steps of
   a.) generating and storing a bit vector indicating locations of zero and non-zero discrete cosine transform coefficients in a sequence of discrete cosine transform coefficients,
   b.) determining and storing a run length of consecutive zero discrete cosine transform values,
   c.) determining and storing a value representing the number of extra bits required to describe a next non-zero discrete cosine transform coefficient value, steps b.) and c.) forming a run/size (R/S) byte d.) storing a discrete cosine transform coefficient value corresponding to said R/S byte following said R/S byte, e.) repeating steps b.), c.) and d.) throughout said data block, and f.) storing at least one of an end-of-block marker and a block length of data stored in steps a.) through e.).

9. A method as recited in claim 8, including the further step of ordering said discrete cosine transformation coefficients in a zig-zag order.

10. A method of compressing image data including steps of a.) performing a discrete cosine transform data of a data block, b.) generating and storing a bit vector indicating locations of zero and non-zero discrete cosine transform coefficients in a sequence of discrete cosine transform coefficients, c.) determining and storing a run length of consecutive zero discrete cosine transform values, d.) determining and storing a value representing the number of extra bits required to describe a next non-zero discrete cosine transform coefficient value, steps c.) and d.) forming a run/size (R/S) byte e.) storing a discrete cosine transform coefficient value corresponding to said R/S byte following said R/S byte, f.) repeating steps c.), d.) and e.) throughout said data block, and g.) storing at least one of an end-of-block marker and a block length of data stored in steps b.) through f).

11. A method as recited in claim 10, further including a step of performing a transformation directly on data in said packed format.

* * * * *